United States Patent [19]

Marsh et al.

[11] Patent Number: 4,930,837
[45] Date of Patent: Jun. 5, 1990

[54] CAMPING CONVERSION

[76] Inventors: Colleen E. Marsh, Box 558A R.D. #4, Mountain Top, Pa. 18707; Kenneth G. Baldwin, Jr., 45 LaGonda Ct., Danville, Calif. 94526

[21] Appl. No.: 206,521

[22] Filed: Jun. 14, 1988

[51] Int. Cl.$^5$ ............................................. B60R 27/00
[52] U.S. Cl. ................................. 296/165; 296/26; 296/175; 296/176
[58] Field of Search .............. 296/26, 164, 165, 175, 296/176, 171

[56] References Cited

U.S. PATENT DOCUMENTS

| | | | |
|---|---|---|---|
| 1,964,894 | 7/1934 | Rohne . | |
| 3,116,085 | 12/1963 | Uttley | 296/26 |
| 3,181,910 | 5/1965 | Thomas | 296/171 X |
| 3,572,809 | 3/1971 | Buland | 296/175 |
| 3,659,893 | 3/1972 | Steele . | |
| 3,730,580 | 5/1973 | Page, Jr. . | |
| 3,778,100 | 12/1973 | Dillard | 296/26 X |
| 3,888,539 | 6/1975 | Niessner . | |
| 4,049,310 | 9/1977 | Yoder | 296/26 |
| 4,163,577 | 8/1979 | Vanderslice . | |
| 4,480,866 | 11/1984 | Komatsu . | |
| 4,557,518 | 12/1985 | Maclean | 296/176 X |

FOREIGN PATENT DOCUMENTS

| | | | |
|---|---|---|---|
| 54098 | 10/1974 | Australia | 296/26 |
| 528037 | 7/1956 | Canada | 296/171 |
| 599734 | 6/1960 | Canada | 296/171 |
| 618007 | 4/1961 | Canada | 296/171 |
| 2224774 | 12/1973 | Fed. Rep. of Germany | 296/171 |
| 2444545 | 4/1976 | Fed. Rep. of Germany | 296/26 |
| 3526420 | 2/1987 | Fed. Rep. of Germany | 296/26 |
| 831221 | 5/1938 | France | 296/170 |
| 1089977 | 3/1955 | France | 296/170 |
| 1570553 | 6/1969 | France | 296/26 |
| 304802 | 1/1929 | United Kingdom | 296/171 |
| 2001589 | 2/1979 | United Kingdom | 296/26 |

Primary Examiner—Margaret A. Focarino
Assistant Examiner—Gary C. Hoge
Attorney, Agent, or Firm—Steele, Gould & Fried

[57] ABSTRACT

A camping conversion for motor vehicles having an open interior compartment. The conversion includes a floor panel supported by tracks and retractable beneath the vehicle floor, and an auxiliary pop-out compartment which protrudes from the side of the vehicle and is retractable into the vehicle interior. In the extended position, the auxiliary pop-out compartment rests on the extended floor panel. The auxiliary pop-out compartment has telescoping sidewalls which overlap one another when retracted to save interior space.

9 Claims, 5 Drawing Sheets

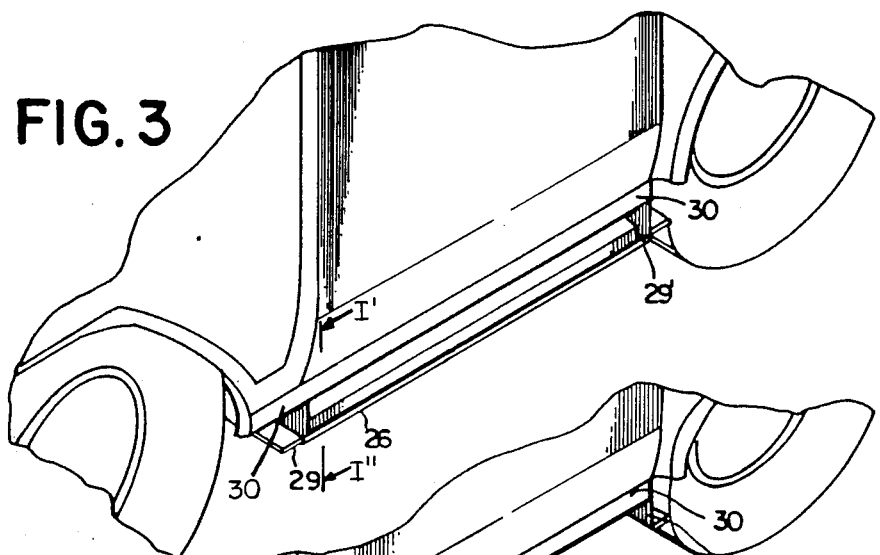
FIG. 3
FIG. 4
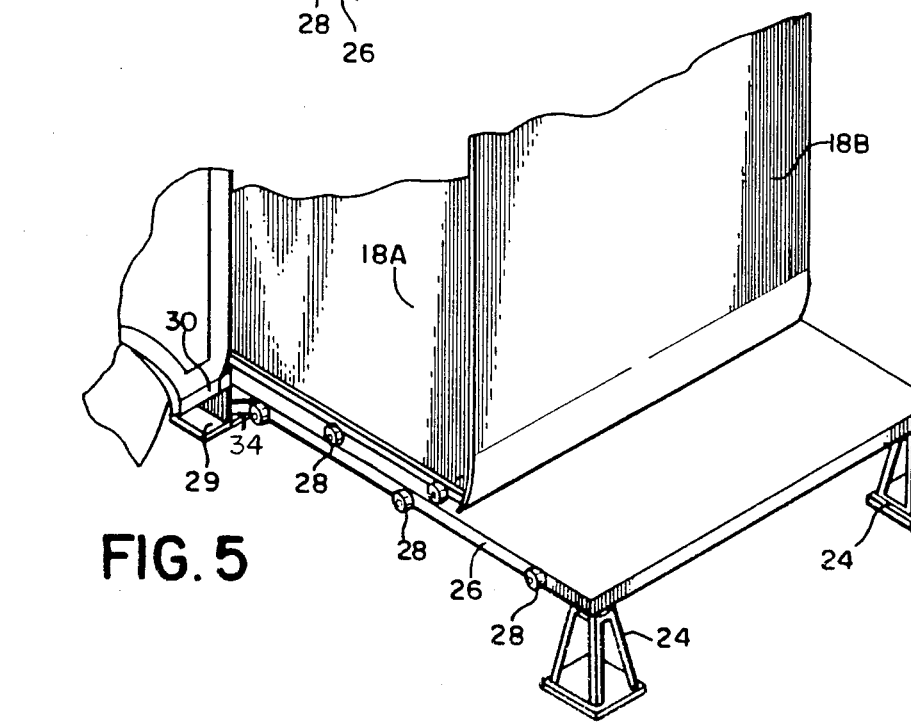
FIG. 5

CAMPING CONVERSION

FIELD OF THE INVENTION

The present invention relates to expansible mobile homes, campers and the like. More particularly, the invention relates to a means for forming compartments in mobile homes which are easily extended and retracted; and, when in the retacted position, do not interfere with the existing space to any noticeable degree.

BACKGROUND OF THE INVENTION

Small camping trailers and most campers (mountable on pickup trucks or truck chassis) are generally satisfactory for two people. As the number of people increases, the space in such small units is increasingly cramped. In traveling back roads and near-wilderness areas, where the roads are rough and quite narrow, larger vehicles with larger living quarters are not feasible. Heretofore, large families had to compromise accommodations and locations. When large families used the larger vehicles they could not camp at out-of-way places with difficult access. When the larger families attempted to use the smaller camping units they were found to be unsatisfactory. Usually some members of the family had to sleep on the ground away from the unit. The larger living quarter units also necessarily slow down highway travel. Whether the unit is a carried or a towed unit, size determines accessibility to various areas and, also, the type and rate of travel over the highways.

U.S. Pat. No. 3,572,809 to Buland discloses a mobile home having laterally extensible side portions. However, in the retracted position the extensible sides close the interior portion so that there is not a complete passageway therethrough and thereby makes very cramped quarters.

U.S. Pat. No. 3,778,100 to Dillard discloses an expandable room for trailers, campers and the like having folding floors, side walls and a roof which collapse when not in use. Collapsible sides have the disadvantage in adding extra width to the campers or trailers, which makes driving hazardous because of imbalance and obstruction of the rear view.

SUMMARY OF THE INVENTION

In accordance with the broader aspects of the invention, there is provided a vehicle such as a mobile home, van, camper, trailer or the like having a laterally extensible compartmented area arranged on at least one longitudinal side thereof which will, when moved laterally into the extended position provide increased living space within the unit. More particularly, there is provided a conversion unit having a substantially open interior defined in part by fixed sidewalls, a floor and a roof, typically in the form of a van. The conversion unit comprises:

a pair of spaced tracks affixed to the vehicle beneath the vehicle's floor and running transversely between the side walls;

a floor panel for an auxilliary compartment;

means for supporting the floor panel by the tracks and enabling movement of the floor panel between a retracted position beneath the vehicle floor and an extended position level with and adjacent to one longitudinal side of the vehicle floor;

a module mounted for movement between retracted and laterally extended positions, the module forming three walls of the auxilliary compartment in the extended position and forming part of one longitudinal side wall and two lateral partitions in the interior compartment in the retracted position;

retractable means carried by the vehicle and extendable to a position over the wall module to form a roof extension; and, means for closing any openings between the wall module, the floor panel, the vehicle and the roof extension.

Advantageously, each of the lateral partition walls of the module comprises two interlockable and relatively slidable lateral wall sections with the respective lateral wall sections overlapping one another when the module is retracted.

Preferably, all the wall sections define a portion of one longitudinal sidewall of the vehicle and interior lateral partitions for the living space in the retracted position and side walls for the expanded compartment in the extended position.

It is, therefore among the objects and advantages of the present invention to provide an expandable room or rooms for trailers, campers or the like which increases the interior size of small camping units.

Another object of the invention is to provide an expandable unit which does not increase the traveling size of the camping unit by any significant amount.

A still further object of the invention is to provide a self-supporting expandable room unit for small camping vehicles.

Yet another object of the invention is to provide an expandable room that is attachable to existing living or camping units.

A still further object of the invention is to provide an expandable room for living or camping units which is easily and quickly attachable to an existing unit, and is easily and simply set up for use on the living or camping unit.

Yet another object of the invention is to provide an expandable room for existing living or camping units which permits such units to be used in the same manner as before installation of the room.

It is a further object of applicant's invention to provide a mobile home unit or the like having a laterally extensible compartmented area arranged on at least one side thereof which will, when shifted into extended position, provide a unit which is completely sealed about the exterior thereof and with the mating surfaces of the main body of the unit.

Other objects and a fuller understanding of the invention will be had by referring to the following description and claims of a preferred embodiment, taken in conjunction with the accompanying drawings, wherein like reference characters refer to similar parts throughout the several views.

BRIEF DESCRIPTION OF THE DRAWINGS

FIG. 3 is a partial perspective view of the floor panel support of the expanded room in the retracted position;

FIG. 4 is a partial perspective view of the floor panel of FIG. 3 partially laterally extended;

FIG. 5 is a partial perspective view of the floor panel of FIG. 3 laterally extended and the compartment module partially extended;

DETAILED DESCRIPTION OF THE PREFERRED EMBODIMENT

Figure 1:
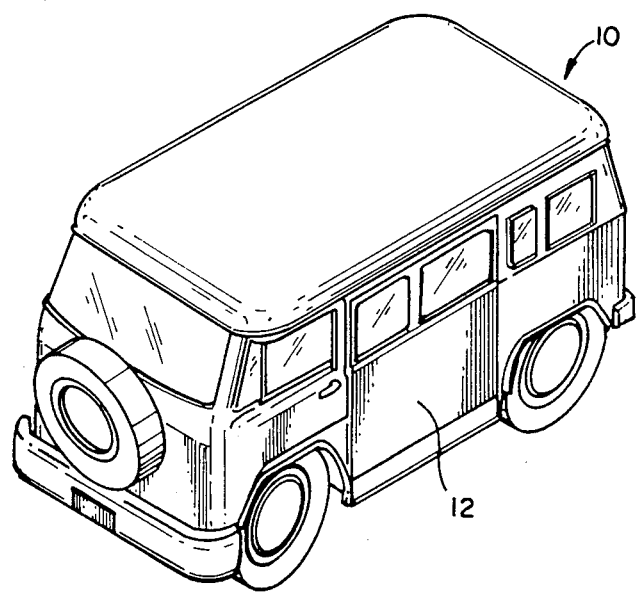
FIG. 1 is a perspective view of a camper van embodying the invention retracted as for travel.

Although specific terms are used in the following description for the sake of clarity, these terms are intended to refer only to the particular structure of the invention selected for illustration in the drawings, and are not intended to define or limit the scope of the invention.

As seen in FIG. 1, a conventional camper van embodying the concepts of this invention generally designated 10 is illustrated in a collapsed or retracted configuration ready for travel. The laterally or transversely extending and extendable section provided by the invention is generally designated 12,12', and as illustrated, is arranged intermediate the ends of the vehicle. In view of structure mounted beneath the floor of the vehicle, the invention is most appropriate for vehicles having front-mounted engines with front wheel drive or rear-mounted engines with rear wheel drive, as such under vehicle structure is likely to interfere with a conventional drive shaft. The extendible unit may be arranged at any point along the length of the vehicle 10 between the front and rear wheels, provided that it does not interfere with other structure of the vehicle. The laterally extendible part may even be made as a portion of the rear of the van 10 if there is sufficient "overhang" behind the rear axle.

Figure 2:
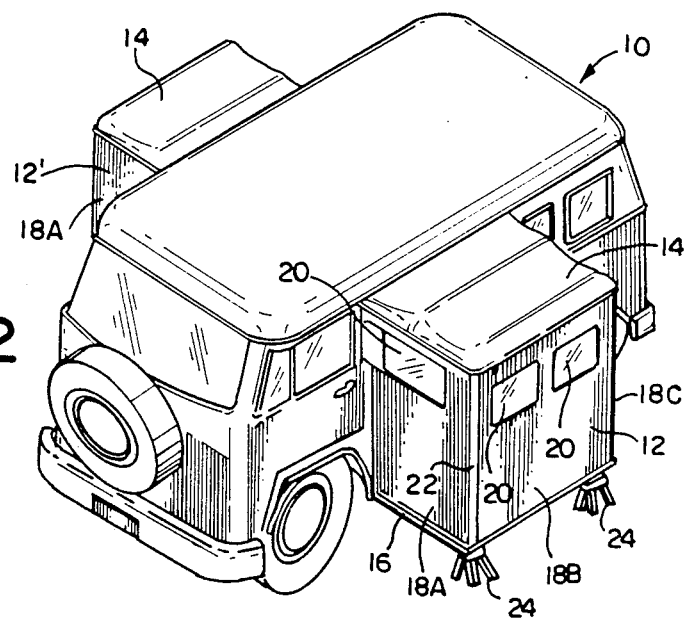
FIG. 2A is a perspective view of the camper van of FIG. 1 illustrating the expandable compartment in an extended position.
FIG. 2B is a diagrammatic illustration of the camper showing, among other things, the extended and retracted sidewall sections of the spaced apart sidewalls disposed on lateral sides of the pop-out compartment (i.e., facing longitudinally forward and backward relative to the vehicle)

As seen in FIG. 2, the camper van with laterally extensible sections 12,12' in their extended positions includes a retractable roof 14, a floor 16, and two lateral walls 18A and 18C, and a longitudinal wall 18B which optionally contain windows 20, mounted together and forming the compartment 12. Advantageously, there are detachable jacks or legs 24 for supporting the extended units.

Preferably, the side walls 18A, 18C of each of the compartments 12,12' interlock and the respective lateral wall sections of each compartment overlap one another when the compartments are retracted. The side walls define a portion of one longitudinal sidewall 18B of the van in the retracted position and lateral interior partitions 21 and 23 of the living space. See FIG. 2B. In such a manner there is no significant loss of usable living space when the compartments 12,12' are retracted.

Figure 2B:
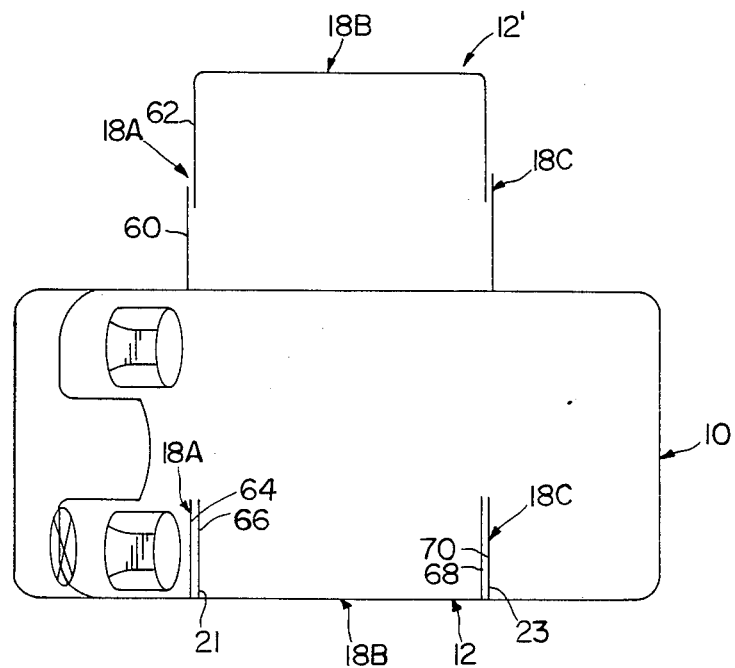

FIG. 2B illustrates a top, cross-sectional view of camper 10. As also shown in FIGS. 1, 2 and 5, longitudinal sidewall 18B forms part of the vehicle's longitudinal sidewall structure. The lateral walls 18A and 18C of the pop-out compartment define the lateral walls of the pop-out compartment when extended, or slide into the vehicle interior when retracted, resulting in interior partitions of the living space. In the embodiment of the invention shown in FIG. 2B, pop-out compartment 12 is retracted and pop-out compartment 12' is extended. In this embodiment, each lateral wall of the pop-out compartment, that is each wall 18A and 18C, comprises relatively slidable sections 60 and 62 which overlap one another when the pop-out module is retracted. When extensible section 12 is retracted into camper 10 as shown, partition walls 21 and 23 are respectively formed by the wall sections 64, 66 and 68, 70. When laterally extensible section 12' is extended, the wall sections 64, 66 and 68, 70 form lateral side walls 18A and 18C of the pop-out compartment.

As shown in FIGS. 3-5, the floors of each of the compartments 12,12' comprise panels 26,27, respectively, having a plurality of end roller means 28 which travel along a track. As seen in FIG. 3, the panels 26,27 in the retracted position are carried by bracket means 29,29' and are slidable because the roller means 28 are within the tracks of the bracket means 29,29'. The bracket means 29,29' are fixed to the bottom of the van's chassis 30. In operation, the panel 26 is extended to form the floor of a compartment 12 and removable legs or jacks 24 are placed at its ends.

In FIG. 5, the interlocked panels 18A, 18B, 18C which form the compartment 12 are shown sliding out from the van 10 on rollers 28 and onto the panel 26 which forms the floor of the compartment 12.

Figure 6:
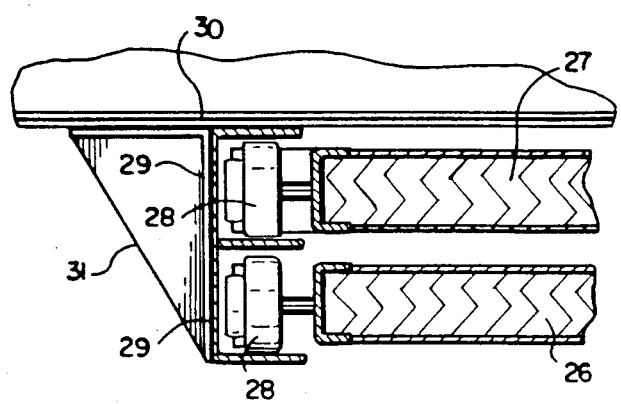
FIG. 6 is a partial expanded front view of the floor panel arrangement from the perspective of section line 6'—6" in FIG. 7.

As shown in FIG. 6, the panels 26,27 are supported by a pair of spaced brackets 29. The brackets 29 are preferably attached to the chassis 30 and further held by support brackets 31 which are attached or welded to the chassis 30. The panels 26,27 are easily movable along their tracks because of the rollers 28.

Figure 7:
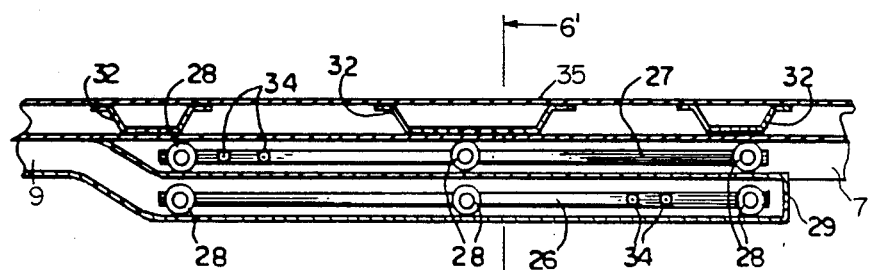
FIG. 7 is a detailed schematic view of the track system with the floor panel in a retracted position from the perspective of section line I'—I" in FIG. 3.

In FIG. 7, the floor panels 26,27 are shown in their retracted positions overlapping one another underneath the chassis 30 so as to conserve space. Lower floor panel 26 moves to the left in FIG. 7 out through opening 9. Floor panel 27 moves to the right out through opening 7. The brackets 29 are further supported underneath the van 10 by attachment to the frame 32. Each panel 26,27 is provided with a pair of twin hinges 34 near its innermost edge, that is, the vehicle floor adjacent edge, that are pivotably mounted in each track. The vehicle floor adjacent edge is the edge of the floor panel closest to vehicle floor 35 when the extensible panel is fully extended as in FIG. 9. The twin hinges 34 provide the function of raising and positioning the panels 26,27 up after extension so as to be level with the floor 35 of the van 10 as shown in FIG. 8.

Figure 8:
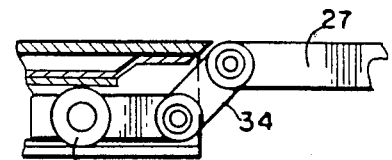
FIG. 8 is a partial schematic view of the twin hinge track system of FIG. 7 in extended position, illustrating the twin hinge support of the extended floor.
Figure 9:
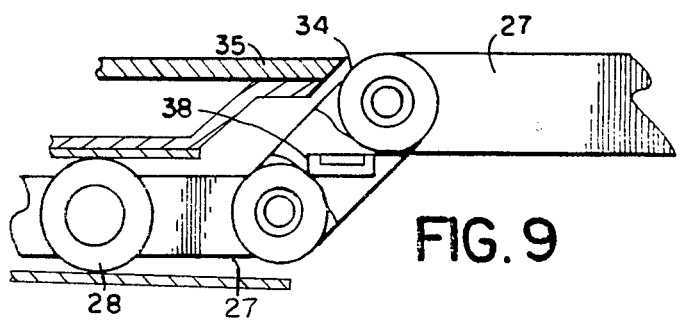
FIG. 9 is an exploded view of the twin hinge of FIG. 7 in cooperation with an interlock.

In FIG. 9 there is shown in greater detail the twin hinge 34 of FIG. 8 extended and supported by interlock support 38. The interlock support 38 is a protrusion which supports the twin hinges in the raised position that can be attached to the frame 32. In operation, the panel 27 is extended out of its track and raised so as to be level with the floor 35. The panel 27 is made level by pivoting it upward by means of the twin links 34. The twin links 34 are then supported on the interlock support 38 so as to keep the floor panel level with the floor 35.

Figure 10:
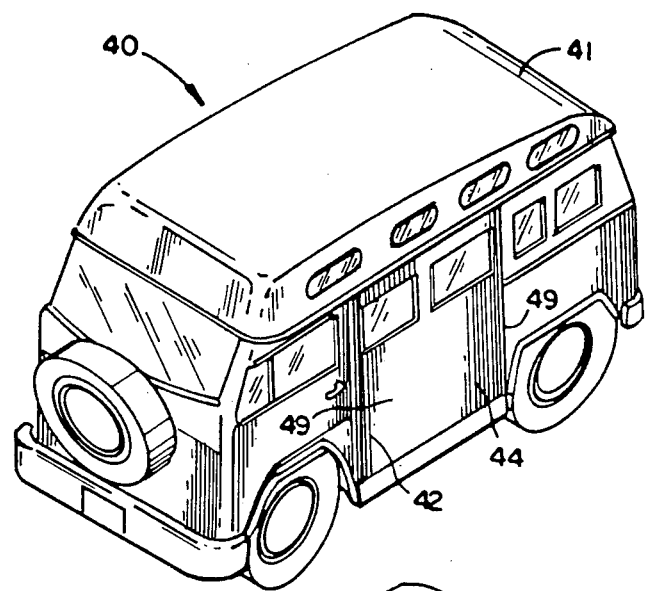
FIG. 10 is a perspective view of a camper van having a pop-up roof section embodying the invention compacted for travel; and, FIG. 11 is a perspective view of the camper van of FIG. 10 in an expanded position and with the roof portion elevated.
Figure 11:
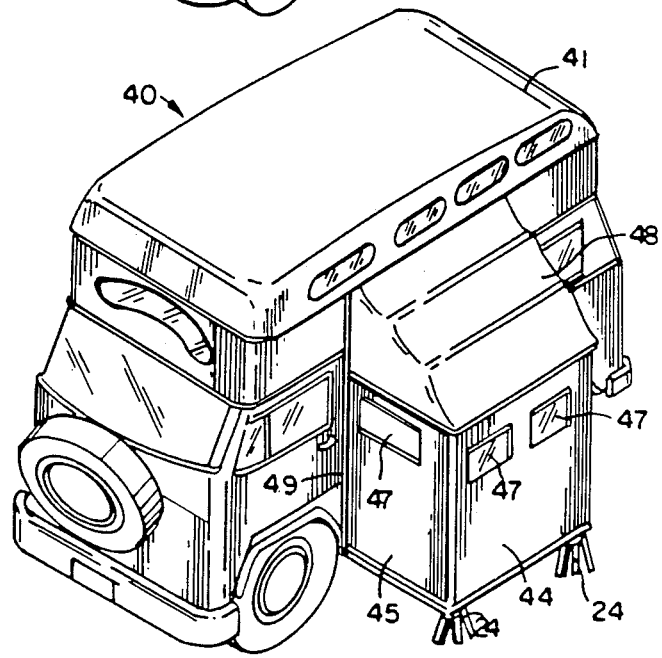

In FIGS. 10 and 11, a camper van 40 with a pop-up roof section 41 is shown. In FIG. 10, the expansible compartment module 42 is shown in the retracted position. The front exterior panel 44 forms the outside of the compartment module 42 in the extended position and the side wall 45 of the van 40 in the retracted position. The side walls 45 as well as the front panel 44 can be provided with windows 47. The panel is supported in its extended position by means of jacks 24. A flexible plastic overlap 49 forms a seal along the edges of the compartment module 42.

In FIG. 11, the roof 48 of the compartment 42 is shown as extending and the roof 41 of the van is in a raised position. The roof 48 can be of any flexible means such as canvas, fabric, plastic, or the like. The roof 48 may be of the type which is retractable or merely placed over the compartment 42.

In order to weatherproof the compartment, flexible plastic means may be placed along open seams to form seals where required, in a known manner.

The floor of the compartments may be of any material. For example, the floor may be plastic, metallic, wood, or the like. The floor should be of such strength that will support persons and furniture in the compartment and resist corrosion and deterioration when retracted.

The panels or side walls forming the compartments may be provided with doors. The doors in the side panels can provide access to the compartment formed within the van when in the retracted and extended positions.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. A camping conversion for motor vehicles of the kind having a substantially open interior compartment defined in part by fixed sidewalls, a floor and a roof, the conversion comprising:
    a pair of spaced tracks affixed to the vehicle beneath the vehicle floor and running transversely between the sidewalls;
    a floor panel for an auxiliary compartment;
    means for supporting the floor panel by the tracks and enabling movement of the floor panel between a retracted position beneath the vehicle floor and an extended position level with and adjacent one side of the vehicle floor;
    the auxiliary compartment having a wall module mounted for movement between retracted and extended positions, the module forming three walls of the auxiliary compartment including spaced apart lateral walls and a longitudinal wall, said lateral walls and said longitudinal wall of the wall module protruding from the vehicle interior in the extended position, and said lateral walls of the pop-out compartment being movable into the interior compartment such that the wall module forms part of one longitudinal side wall of the vehicle in the retracted position, the lateral walls of the wall module each comprising wall sections which slide over and overlap one another when the wall module is retracted, thereby forming a lateral partition of the interior compartment when the module is retracted;
    retractable means carried by the vehicle and extendable to a position over the wall module to form a roof extension; and,
    means for closing open seams between the wall module, the floor panel, the vehicle and the roof extension as necessary to substantially weatherproof the auxiliary compartment, whereby the size of the interior compartment may be significantly increased with minimal loss of usable space therein when all constituent parts of the auxiliary compartment are retracted.

2. A camping conversion according to claim 1, wherein the means for supporting the floor panel comprises:
    a plurality of rollers rotatably mounted on edges of the floor panel, the rollers moving in the tracks;
    a link pivotally mounted in each track and pivotally mounted near the vehicle-floor-adjacent edge of the floor panel for raising and positioning the floor panel, said vehicle-floor-adjacent edge being the floor panel edge closest to the vehicle floor when the floor panel is fully extended.

3. A camping conversion according to claim 1, further comprising auxilliary means for supporting the auxilliary compartment when the constituent parts are extended.

4. A camping conversion according to claim 1, comprising:
    two pairs of the spaced tracks affixed to the vehicle beneath the vehicle floor disposed one above the other and opening to opposite sides of the vehicle;
    two of each of the constituent parts for forming two auxilliary compartments, one on each side of the vehicle, one of the floor panels being supported by each pair of tracks.

5. A camping conversion according to claim 4, wherein the means for supporting the floor panels comprises:
    a plurality of rollers mounted on edges of the floor panels, the rollers moving in the tracks;
    two links pivotally mounted near the vehicle-floor-adjacent edge of each of the floor panels and pivotally mounted one each in each of the tracks, for raising and positioning the respective floor panels, said vehicle-floor-adjacent edge being the floor panel edge closest to the vehicle floor when the floor panel is fully extended.

6. A camping conversion according to claim 1, further comprising auxilliary means for supporting the auxilliary compartment when the constituent parts are extended.

7. A camping conversion for increasing living space in vans and the like, comprising:
    a pair of spaced track means affixed beneath the van and extending transversely between fixed side walls thereof;
    a first panel means defining a floor for a pop-out compartment;
    means for supporting the first panel means by the track means and enabling movement of the first panel means between a retracted position beneath the vehicle floor and an extended and elevated position to one side of the van; and,
    further panel means mounted on the van for movement between a retracted position, wherein the further panel means define a portion of one longitudinal sidewall of the van and interior lateral partitions for the living space in a retracted position, and an extended position, wherein the further panel means define lateral side walls and a longitudinal sidewall for the pop-out compartment opening onto and enlarging the living space, wherein each of the lateral sidewall comprises relatively slidable lateral wall sections overlapping one another to form said interior lateral partitions when the pop-out compartment is retracted, whereby the living space may be significantly increased by extending the pop-out compartment, with minimal loss of usable living space when the first and further panel means forming the pop-out compartment are retracted.

8. A camping conversion according to claim 7, wherein the means for supporting the first panel means comprises:
  a link means, pivotally mounted in each track means and pivotally mounted adjacent that edge of the floor panel means adjacent the van in the extended and elevated position, for elevating the floor panel means.

9. A camping conversion according to claim 8, wherein said first panel means is provided with a plurality of rollers moving in a track for moving said panel between retracted and extended positions.

* * * * *